(No Model.) 2 Sheets—Sheet 1.

D. W. BROATCH.
CONCAVE AND FEED BOARD FOR THRASHING MACHINES.

No. 520,725. Patented May 29, 1894.

WITNESSES:
William Goebel
C. Sedgwick

INVENTOR
D. W. Broatch
BY
Munn & Co
ATTORNEYS.

(No Model.) 2 Sheets—Sheet 2.

D. W. BROATCH.
CONCAVE AND FEED BOARD FOR THRASHING MACHINES.

No. 520,725. Patented May 29, 1894.

WITNESSES:
William Goebel
C. Sedgwick

INVENTOR
D. W. Broatch
BY
Munn & Co
ATTORNEYS.

THE NATIONAL LITHOGRAPHING COMPANY,
WASHINGTON, D. C.

UNITED STATES PATENT OFFICE.

DAVID W. BROATCH, OF PEPIN, WISCONSIN.

CONCAVE AND FEED-BOARD FOR THRASHING-MACHINES.

SPECIFICATION forming part of Letters Patent No. 520,725, dated May 29, 1894.

Application filed August 5, 1893. Serial No. 482,437. (No model.)

*To all whom it may concern:*

Be it known that I, DAVID W. BROATCH, of Pepin, in the county of Pepin and State of Wisconsin, have invented a new and Improved Concave and Feed-Board for Thrashing-Machines, of which the following is a full, clear, and exact description.

My invention relates to an improvement in the concaves and feed boards of thrashing machines, and the object of the invention is to regulate the draft in hand or self-feeding thrashing machines, and to provide a means whereby the concave can be conveniently and expeditiously adjusted to or from the cylinder to suit any kind of grain that may be passed through the machine, thereby insuring perfect results, and the machine is at the same time made to feed evenly and smoothly.

A further object of the invention is to provide a means whereby the concave may be adjusted vertically to and from the cylinder, and likewise adjusted in a lateral direction to or from the feed end of the machine, parallel with the cylinder in both cases.

A further object of the invention is to provide a means for moving the concave from an extreme upper to an extreme lower position, or at any point between the two, the concave being moved around and concentric with the cylinder.

A further feature of the invention is to so connect the concave and the feed board that the latter will be adjusted simultaneously with the former and in the same direction.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
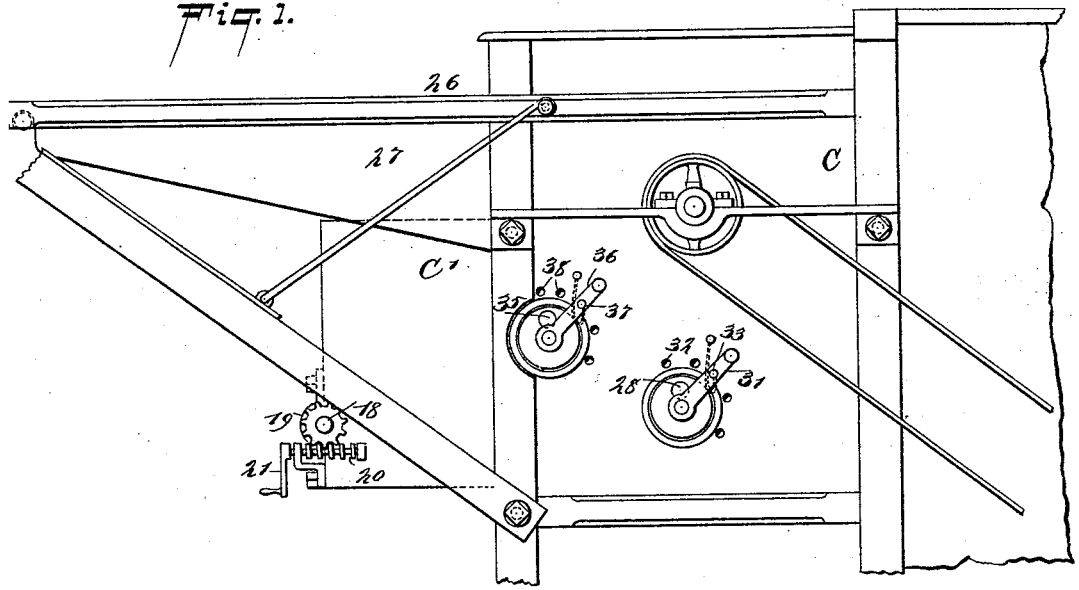
Figure 2:
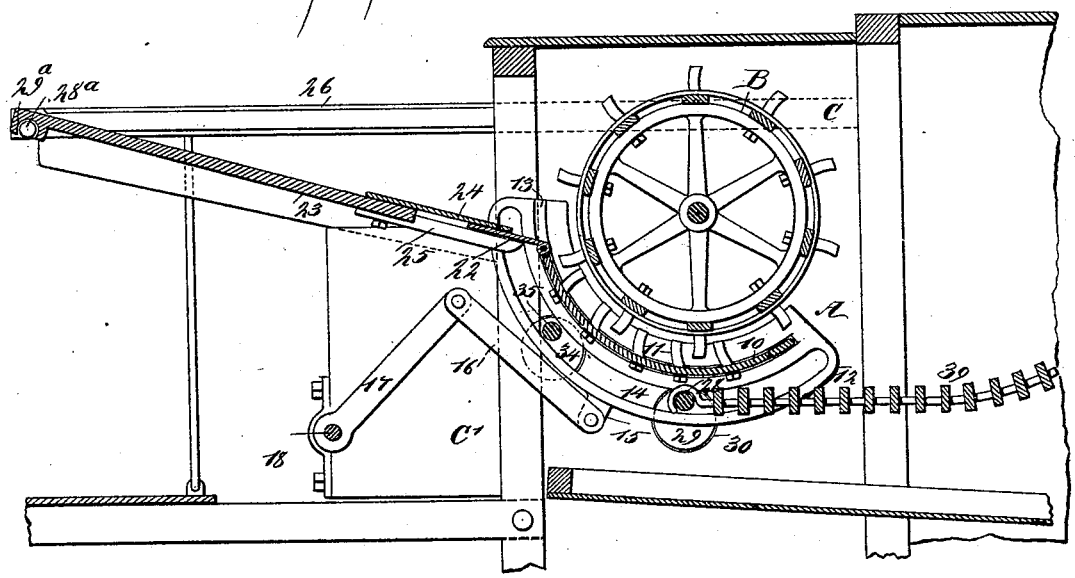
Figure 3:
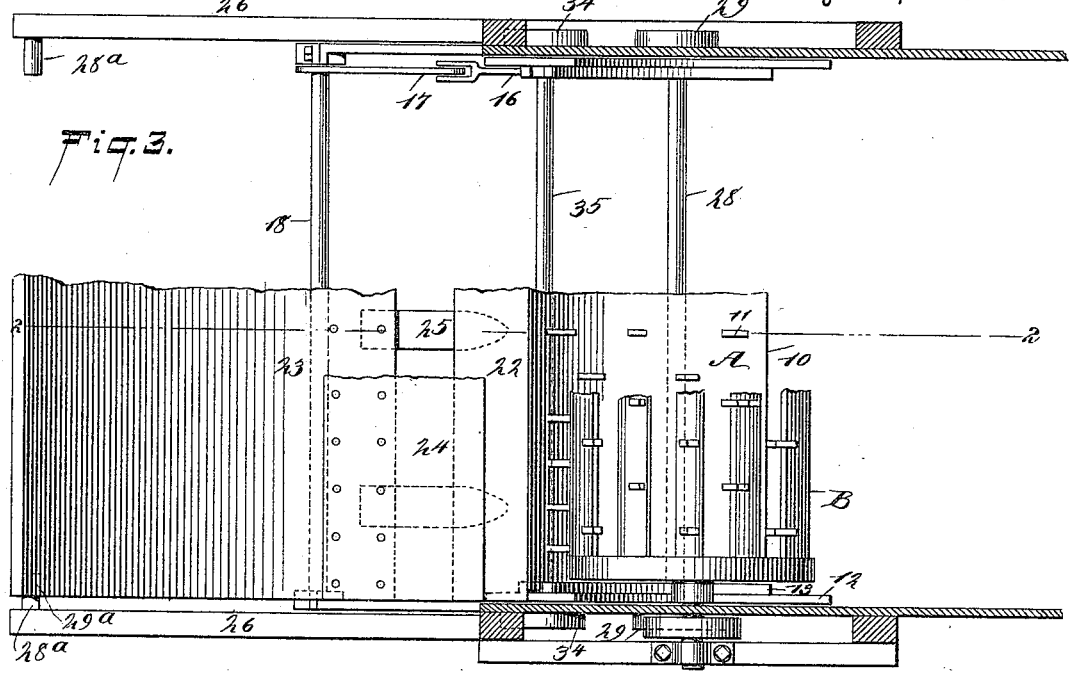
Figure 4:
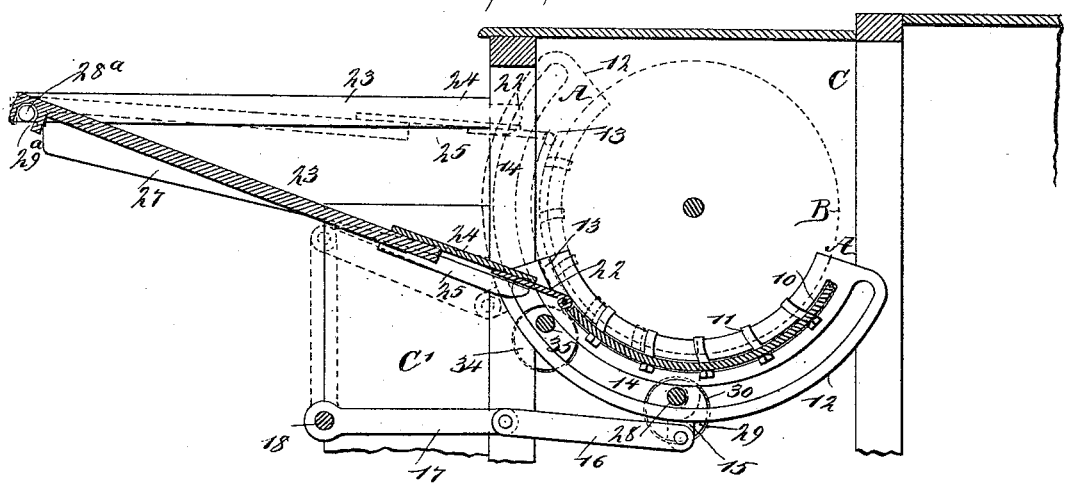
Figure 5:
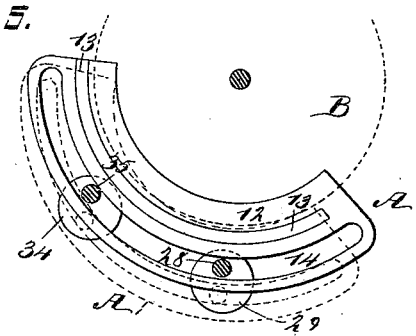

Figure 1 is a side elevation of a portion of a thrashing machine, illustrating the application of the improvement thereto. Fig. 2 is a central vertical section taken practically on the line 2—2 of Fig. 3. Fig. 3 is a plan view, portions of the concave and part of the cylinder being broken away to disclose the adjusting shafts. Fig. 4 is a vertical section through a concave and feed board, illustrating them in practically their lower position, and illustrating in dotted lines the uppermost position of the concave and feed; and Fig. 5 is a diagrammatic view, illustrating the movement of the concave when adjusted to its farthest extent both laterally and vertically.

The concave A, is located beneath the cylinder B, sustaining the customary relation to the cylinder. The concave, however, consists of the concaved body section 10 in which the teeth 11, are located, and what may be termed semi-circular bearings 12, which form practically the sides of the concave. Each of the semi-circular bearings 12 consists of a plate shaped as its name denotes; and upon the inner face of each plate a slide-way 13, is formed, into which the ends of the body portion of the concave are introduced.

At or near the lower end of each semi-circular bearing 12 or side piece of the concave, a semi-circular slot 14, is produced; and from the central portion of the under edge of each side or bearing 12 a lug 15, is projected, or any equivalent thereof. It will be understood that the body 10 of the concave may be made in one piece, or it may consist of a series of sections properly abutted at their adjoining edges.

The sides or bearings of the concave are not attached in any manner to the sides of the machine. They are, however, connected by links 16 and crank arms 17 with an adjusting shaft 18, which shaft is journaled in the forward lower portion of the casing in which the concave and the cylinder are located, or an extension of said casing. In the drawings the shaft 18 is shown placed in an extension of the main casing, and the main casing is designated as C while the extension is designated as C'. Two crank arms 17 are inwardly projected from the adjusting shaft, and their inner ends are pivotally connected each with a link 16, while the inner ends of the links are pivotally connected with the lugs 15 on the concave. The adjusting shaft 18, is provided at one end with a worm wheel 19, which meshes with a worm 20, as shown in Fig. 1, the worm shaft being turned by means of a suitable crank 21, or its equivalent; but a lever may be substituted for the worm and worm wheel if in practice it is found desirable.

The feed board section 22, has hinged connection with the upper edge of the concave; and the feed board 23, is provided at its lower end with a plate 24 secured upon its upper face, extending a predetermined distance beyond the said inner end, and a series of fingers 25, is firmly attached to the bottom of the feed board, extending beneath the plate 24; the feed board section 22 of the concave is connected with the feed board section 23 by being passed into the space between the fingers 25 and plate 24, as shown in Figs. 2, 3 and 4.

The outer or front end of the feed board is pivotally connected, preferably at its sides, with beams 26, projected from the forward casing of the thrasher, as shown in the drawings; and suitable side boards 27, may be and preferably are projected downward from the said beams 26. Ordinarily the pivotal connection of the feed board with the frame is effected as illustrated, consisting in locating upon the inner faces of the beams 26 pins 28$^a$, which enter sockets 29$^a$, produced in the feed board, as best shown in Fig. 2. It will thus be observed that by manipulating the adjusting shaft 18 the concave may be carried upward or may be lowered, moving concentrically with the cylinder and around it, and that when the concave is carried to its upper position the feed board will be placed almost in a horizontal position, as shown in dotted lines, Fig. 4. Consequently the feed will be quite slow; whereas, when the concave is lowered to the position shown in Fig. 2, the feed board will be slanted downward and inward to such an extent as to provide for a substantially rapid feed; whereas, when the concave has been shifted to its lowest position, which is immediately beneath the cylinder, and as shown in positive lines, Fig. 4, the feed board will have such a decided downward inclination as to insure a most rapid feed.

With reference to the vertical adjustment of the concave and its adjustment to and from the feed end of the machine, in order to decrease or to increase the receiving capacity or draft between the concave and the cylinder, a vertical adjustment is effected through the medium of a shaft 28, passed through the slots 14 in the sides of the concave, the shaft being located practically beneath the central lower portion of the cylinder, and two eccentrics 29, to which the ends of the shaft are connected. Each eccentric is of disk form, and is held to turn in a circular bearing 30, formed in the side of the main casing C; and as the two eccentrics are connected by the shaft 28, when one of them is moved the other is carried in the same direction. Many ways may be devised for rotating the eccentrics, and in the drawings a simple device is illustrated, which consists in attaching to one of the eccentrics at its center a lever or crank 31, and producing in the casing C around the bearing of the eccentric a series of apertures 32. The crank arm or lever is in this event provided with a single aperture adapted to receive a pin 33, connected with the casing; and when the lever or crank arm has been moved in a manner to give proper vertical adjustment to the concave, the eccentrics and their connecting shaft are held in their adjusted position by passing the pin 33 through the aperture in the crank arm or shaft and the aperture 32 with which it may register. But the eccentrics may be operated by suitable gearing.

The mechanism for adjusting the concave to or from the feed end of the machine is identical with the adjusting mechanism just described, and consists of two eccentrics 34, held to turn in suitable bearings in the casing, the eccentrics being connected by a shaft 35, which is located nearly mid way between the top and bottom of the cylinder, and forward of it, the shaft 35, being also made to pass through the slot 14 in the concave; and in connection with this forward adjusting mechanism a crank arm 36, is employed, connected with one eccentric; and a pin 37 is connected with the casing, and apertures 38, are made in the casing to receive the pin after it has been passed through an opening in the crank arm or lever, as shown in Fig. 1.

In Fig. 5 one of the sides or bearings of the concave is shown in positive lines in its nearest position to the cylinder, having been adjusted both vertically and laterally by both of the eccentric adjusting devices, while in dotted lines the side or bearing of the concave is shown in like manner farthest removed from the cylinder.

It will be understood that any equivalent of the adjusting mechanism shown may be substituted. The grate 39, has a loose bearing upon the shaft 28 of the inner adjusting device, so that the said rattle rake will move with the concave.

This device is exceedingly simple, it is durable and it is economical, and may be applied to any thrashing machine whether it be a hand or a power thrasher, and when such an attachment is made, wheat straw, or oat straw, whether it be wet or dry, may be thrashed with equal facility, and in no case will there be a waste of material when proper adjustment has been made.

Having thus described my invention, I claim as new and desire to secure by Letters Patent—

1. In a thrashing machine, a concave provided with longitudinal slots that are essentially concentric with the cylinder, supports carried by the machine and projecting into the slots of the concave to form guides along which the concave may be adjusted around the cylinder, and means for moving either of the said supports of the concave to adjust the latter in relation to the feed end of the machine or to the shaft of the cylinder, as and for the purpose set forth.

2. In a thrashing machine, a concave provided with longitudinal slots that are essentially concentric with the cylinder, shafts journaled eccentrically in the frame of the machine and extending into the slots of the concave to form guides along which the concave may be adjusted around the cylinder, and means for turning said shafts to adjust the concave in relation to the feed end of the machine and to the shaft of the cylinder, substantially as described.

3. In a thrashing machine, the combination, with the cylinder and the adjustable concave, of a feed board section hinged to the edge of the concave adjacent to the feed end of the machine, another feed board section the upper end whereof has pivotal connection with the frame of the machine, and a plate secured to the lower end of one of the feed board sections and adapted for sliding engagement with the other feed board section, substantially as described.

4. In a thrashing machine, the combination, with the cylinder and the adjustable concave, of a feed board section hinged to the edge of the concave adjacent to the feed end of the machine, another feed board section the upper end whereof has pivotal connection with the frame of the machine, a plate and a series of fingers secured to one end of one of the feed board sections and adapted to receive the other feed board section between them, as and for the purpose set forth.

5. In a thrashing machine, a concave provided with longitudinal slots that are essentially concentric with the cylinder, adjustable supports carried by the machine and projecting through the slots of the concave to form guides along which the concave may be adjusted around the cylinder, and a grate connected with the inner supports of the concave, whereby the inner end of the concave and the said grate are caused to move in unison, substantially as described.

DAVID W. BROATCH.

Witnesses:
JOHN W. MURDOCH,
JOHN N. MURDOCH.